United States Patent

Pearce et al.

[11] 3,959,966
[45] June 1, 1976

[54] GAS TURBINE ENGINE

[75] Inventors: Bryan Robert Pearce; Walter James Powell, both of Bristol, England

[73] Assignee: Rolls-Royce (1971) Limited, England

[22] Filed: Sept. 30, 1974

[21] Appl. No.: 510,766

[30] Foreign Application Priority Data
Oct. 5, 1973  United Kingdom............... 46753/73

[52] U.S. Cl.............................. 60/39.32; 60/39.65; 60/39.66; 415/192; 415/202; 415/139
[51] Int. Cl.[2]...................... F02C 7/20; F01D 25/28
[58] Field of Search............ 60/39.32, 39.36, 39.65, 60/39.66; 415/191–195, 202, 139, 115

[56] References Cited
UNITED STATES PATENTS

| | | | |
|---|---|---|---|
| 2,859,934 | 11/1958 | Halford et al........................ | 415/114 |
| 3,363,416 | 1/1968 | Heybyrne et al. .................. | 60/39.32 |
| 3,558,237 | 1/1971 | Wall..................................... | 415/115 |
| 3,575,528 | 4/1971 | Beam et al.......................... | 60/39.66 |
| 3,750,398 | 8/1973 | Adeuzzi et al...................... | 60/39.32 |

FOREIGN PATENTS OR APPLICATIONS
1,942,346  3/1971  Germany ........................... 415/115

*Primary Examiner*—Carlton R. Croyle
*Assistant Examiner*—Robert E. Garrett
*Attorney, Agent, or Firm*—Stevens, Davis, Miller & Mosher

[57] ABSTRACT

The disclosure of this invention pertains to a gas turbine engine having an annular combustion chamber having an outlet duct to turbine entry vanes, an extension of the combustion chamber connecting a radially outer wall of the duct to fixed structure at a position adjacent the downstream and of the vanes, wherein the wall is covergent in the downstream direction, the extension is connected to the wall at a location upstream of the downstream extremity thereof, and cooling air passages ae arranged to lead cooling air to the junction so that on heating of chamber in operation said extremity expands radially outwardly and in the downstream direction thereby to make sealing engagement with an adjacent extremity of a shroud ring of the vanes.

4 Claims, 3 Drawing Figures

GAS TURBINE ENGINE

This invention relates to gas turbine engines.

It is known from our United Kingdom Pat. No. 1,086,432 to provide a gas turbine engine comprising a combustion chamber arrangement having an annular outlet duct defined by radially inner and outer walls, an annular array of vanes having inner and outer shroud rings, an upstream extremity of the outer ring axially confronting a downstream extremity of the outer wall, an extension of the duct having an upstream end connected to the outer wall at a junction upstream of said extremity thereof and a downstream end situated adjacent the downstream end of the outer ring at a diameter larger than that of said junction, a support structure, and means connecting the downstream ends of the extension and of the outer ring to the support structure.

Sealing between said extremities is intended to be ensured essentially by close proximity therebetween. It has however been observed (by X-ray photography during running of the engine) that on heating of the engine from the cold to the operating state, said confronting extremities tend to separate with a consequent loss of sealing properties.

As will be described in detail later herein, it has been found that said separation is related to the temperature difference between the respective ends of the extension, the upstream end being the hotter, and to the different diameters of these ends. In certain engines, especially relatively small engines, these differences are sufficiently great for the loss of sealing properties to be significant. It is an object of this invention to overcome this difficulty.

According to the invention there is provided means for cooling the upstream end of the extension, said junction is positioned upstream of said extremity by a distance sufficient to allow for a rise in temperature towards said extremity of the outer wall, and said outer wall is convergent towards said downstream extremity thereof.

The cooling of the upstream end of the extension restricts the upstream expansion of the extension and thereby restricts the separation of said extremities. The convergent shape of the outer wall and the temperature rise towards the downstream end thereof favour downstream expansion of the wall with a consequent tendency for said extremity of the wall to be urged against the facing extremity of the adjacent shroud ring.

An example of a gas turbine according to this invention will now be described with reference to the accompanying drawing wherein.

Figure 1:
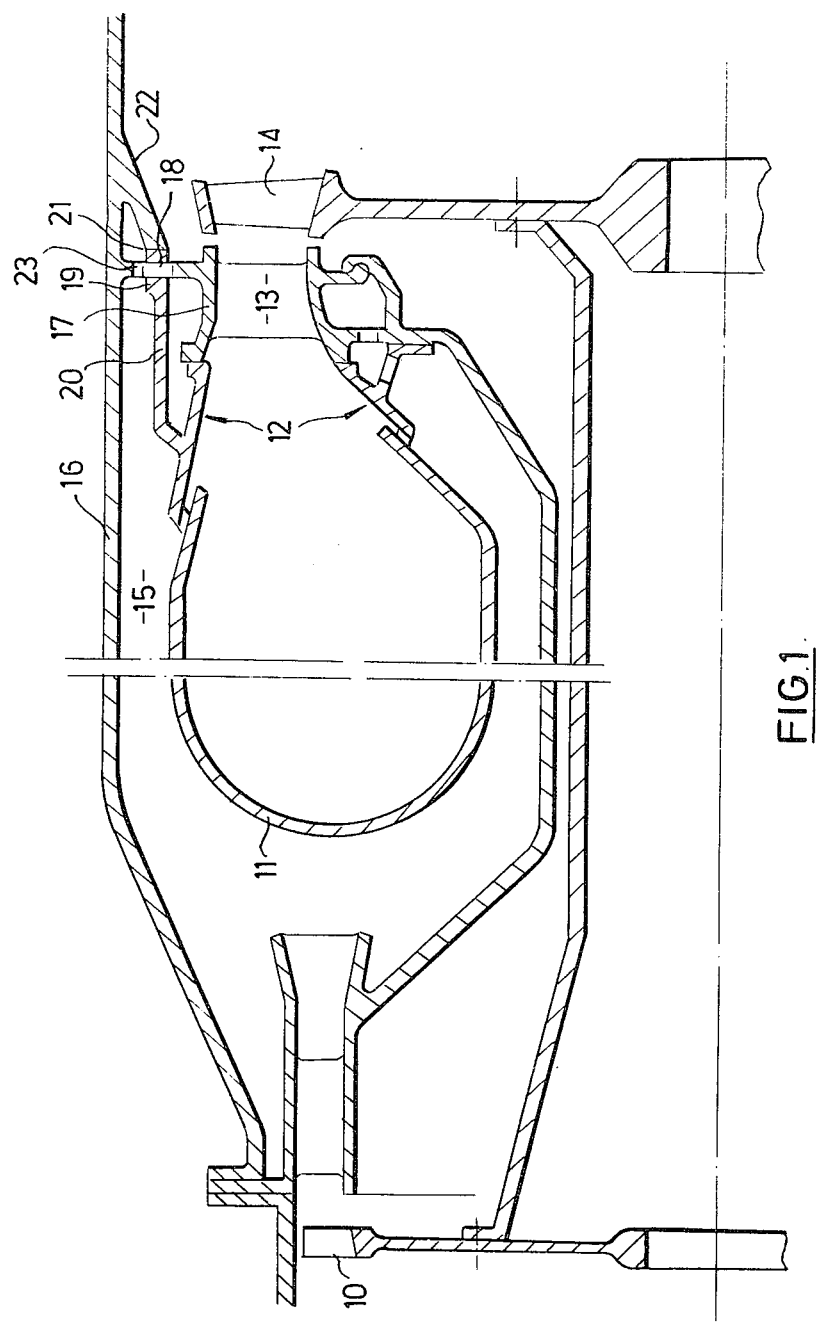
FIG. 1 is a sectional elevation of part of a gas turbine engine.
Figure 2:
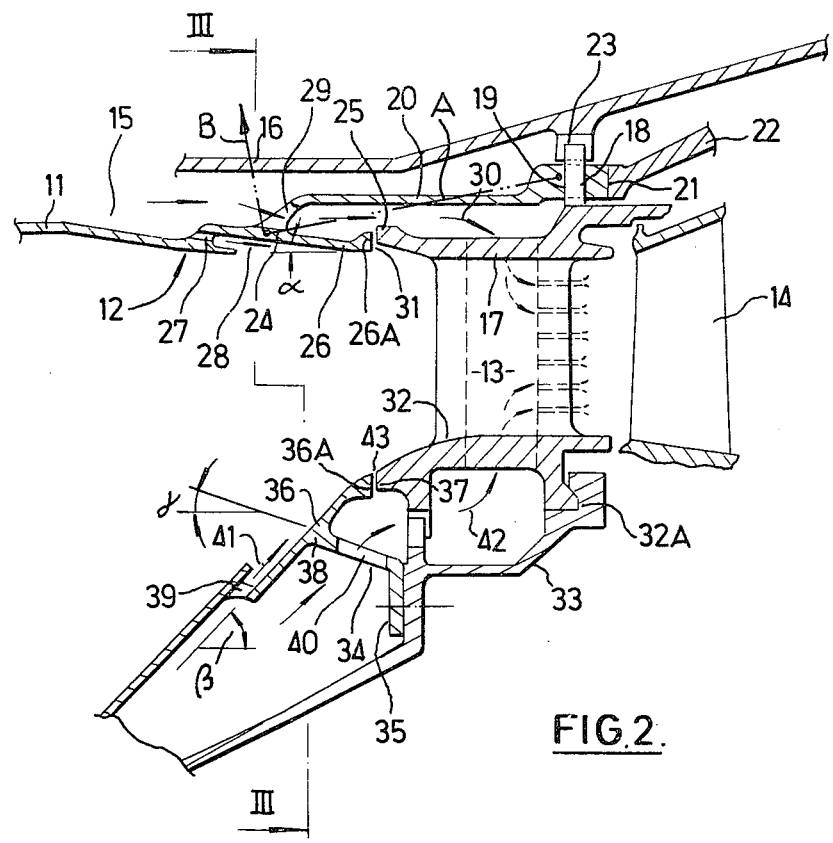
FIG. 2 is an enlarged detail of FIG. 1.
Figure 3:
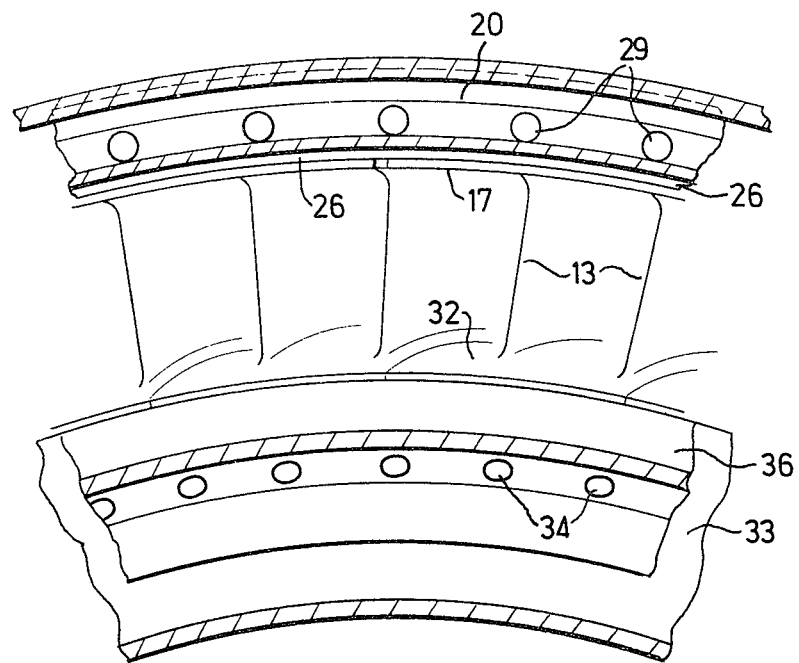
FIG. 3 is a section on the line III—III in FIG. 2.

Referring to the drawings the engine comprises in flow series a compressor 10, an annular combustion chamber 11 having a generally convergent outlet duct 12, an annular array of vanes 13, and an axial flow turbine 14. The output of the compressor reaches the combustion chamber through a duct 15 formed between the chamber and a casing 16 surrounding it.

The vanes 13 each comprise an outer shroud 17 provided at its downstream end with a lug 18 engaging an aperture 19 in a cylindrical extension 20 of the chamber 11 surrounding the vanes. The arrangement is such that the axial pressure drop across the vanes urges the combustion chamber in the downstream direction against an abutment face 21 provided on a support structure or casing 22 of the turbine. The torque on the vanes is reacted to by engagement between the lugs 18 and the casing 22 as shown at 23.

The extension 20 emanates from the duct 12 at a junction 24 which lies upstream of an upstream end face or extremity 25 of the shroud 17, and the duct 12 has an outer wall 26 extending from the junction 24 and having a downstream end face or extremity 26A confronting the face 25. A small distance upstream of the junction 24 there is provided an annular array of holes 27 for admitting air to the interior of the duct 12 to form a cooling film 28 therealong. The extension 20 is provided with holes 29 through which is admitted an airflow 30 for cooling the extension and subsequently cooling the vanes.

The purpose of the arrangement described is to make it possible for the structure in and around the duct 12 to cope with the range of temperatures, say 500°C, with which the structure has to cope when expanding from the cold state to operating temperature, and especially to close a gap 31 which exists in the cold state of the engine between the faces 25,26A. This gap is necessary essentially to facilitate assembly and to allow for manufacturing tolerances but insofar as there is communication between the casing 16 and the interior of the extension, the gap results in loss of cooling air during running.

It will be clear that the components affecting the size of the gap 31 are the wall 26, the extension 20 and the vanes 13, and the arrangement of these components is so chosen that the gap 31 is closed when these components expand axially from the cold to the operating state. For the purpose of determining the effect of such expansion on the gap, the face 21 may be regarded as a fixed point in space because both the extension 20 and the vanes abut this face of the casing 22. On heating, the shroud 17 and the extension 20 expand in the upstream direction away from the face 21, and the wall 26 expands away from the junction 24 in the downstream direction. It has been found that in the past the expansion of the extension 20 tended to dominate the total expansion in the sense of resulting in an enlargement of the gap 31. This was attributable to the facts that the upstream end of the extension 20, i.e. the junction 24, is hotter than the downstream end adjacent the face 21 because the junction 24 is in contact with combustion products, and that the upstream end is of smaller diameter. Effectively, the extension is a cone defined by a line A having an angle δ. The expansion of this cone is determined by three components. Firstly, there is the ordinary axial component whereby the extension will simply lengthen. Secondly, there is the radial component and here account must be taken of the cone angle and of the temperature difference between the ends of the extension 20. On heating the diameter of the hotter end will increase relative to the cooler end in the sense of reducing the angle δ, thereby causing expansion of the hotter end in a direction B which has an axial component. The occurrence of the latter or second axial component significantly adds to the first axial component. The invention provides for the elimination of such amplification of axial expansion by so cooling the downstream end of the extension 20 that the temperature of this extension remains uniform over its whole length. To this end the holes 27,29 are of such diameter that sufficient air is caused to flow past the junction 24 for the temperature thereof not to exceed that of the remainder of the extension.

However, the amplification effect which was a disadvantage in the extension is used to advantage in the wall 26. The holes 27 are so dimensioned that the cooling effect of the flow therethrough becomes dissipated, i.e. the film 28 mixes with the combustion products, on the way towards the downstream end of the wall 26 so that the latter end becomes significantly hotter than the junction 24. At the same time, the wall 26 is made to be of conical shape in the sense of being convergent in the downstream direction as indicated by an angle $\alpha$. In consequence there occurs a said second axial component to improve the closure of the gap 31.

At the radially inner ends of the vanes 13 shrouds 32 of the vanes are connected at their downstream ends at 32A to a ring 33. Adjacent the upstream end of the vanes the duct 12 is connected to the ring 33 by means of an extension 34 and a flange 35. The duct 12 itself includes a part 36 having a downstream end face 36A confronting an annular upstream end face 37 formed collectively by the shrouds 32. The extension 34 emanates from the part 36 at a junction 38. Cooling air holes 39,40 are provided respectively in the duct 12 and the extension 34 for establishing a cooling film 41 and a cooling flow 42 to the vane. In the present case, and contrary to what was the case with the part 26, the cone angle $\beta$ of the part 36 is unavoidably such that a relatively higher temperature at the end thereof adjacent the face 37 would result in opening up of gap 43. To cope with this situation the part 36 is made axially short in relation to the extension 34 and the latter is made cone-shaped such as to be divergent in the downstream direction at an angle $\alpha$. As a result of the cone angle 60, a temperature superiority at the junction 38 over the flange 35 results in the gap 43 tending to close. The distance between the junction 38 and holes 39 is made sufficiently large to ensure that the cooling film 41 is substantially dissipated by the time it reaches the junction 38 so that the junction 38 can attain said temperature superiority over the flange 35 notwithstanding the cooling effect of the flow through the holes 34. Also as a result of said dissipation of the film 41, any temperature rise from the junction 38 towards the face 36A is small so that the effect of the cone angle $\beta$ cannot significantly negate the effect of the cone angle $\alpha$.

The invention is not limited to annular combustion chambers instead of the single annular chamber 11 there may be an annular arrangement of individual chambers but having an annular outlet duct e.g. such as the duct 12, whereby to co-operate with inlet guide vanes as described hereinabove.

It is to be understood that the shrouds 17 of the respective vanes 13 form a segmented shroud ring, a similar ring being formed by the shrouds 32. Alternatively, the shrouds may be in the form of continuous rings.

The foregoing description will enable those skilled in the art to carry out the invention with the use of known ways and means. So, for example, given an initial design, the angle $\delta$ and the length of line A are known from the mechanical lay-out of the engine. The temperature of the air surrounding the combustion chamber and the temperature of the various points on the combustion chamber and components adjacent thereto are known engine data. The temperature diffence between the junction 24 and the downstream end of the extension 20 is therefore known or readily determinable. The coefficient of expansion of the materials concerned would be known. It is therefore a simple calculation to determine the movement of the junction 24 relative to the face 21 under such a temperature rise. Clearly, the smaller the angle $\delta$ the less will be the total upstream expansion. If the upstream expansion is considered too high and the angle $\delta$ cannot be reduced by a change in design, then cooling of the junction 24 has to be used.

It may be assumed that the holes 29 are present already to admit cooling air to the vanes 13 so that a certain amount of cooling of the extension is present already but, by the same token, there is direct access of the cooling air to the gap 31 and if this gap is excessive the vanes would be starved of cooling air. The most effective way to overcome the difficulty is by the cooling holes 27. It is well known from empirical and other data how to generate a cooling film of a particular effectiveness so that those in the art will understand how to choose the sizes and mutual proximity of the holes, and proximity of the holes to the junction 24, to give a film 28 capable of lowering the temperature of the junction by a given amount.

If the cooling by the film 28 is not by itself sufficient the holes 29 can be enlarged to supplement the effect of the film 28. As regards the effect of the cone angle $\alpha$, the steps to be taken correspond to those explained in respect of the extension 20. Clearly, the greater the angle $\alpha$ the greater the total axial expansion of the wall 26.

Also, the further the junction 24 is arranged upstream from the face 26A the better will be the temperature rise towards the face 26A and the smaller will be the angle $\delta$ of the extension 20.

We claim:
1. A gas turbine engine, comprising: a combustion chamber having an annular outlet duct defined by
radially inner and outer chamber walls; an annular array of vanes having inner and outer shroud rings,
said outer shroud ring having an upstream extremity confronting a downstream extremity of said outer chamber wall;
an extension member extending radially outwardly and axially downstream from said outer chamber wall, said extension member being connected to said outer chamber wall at a junction upstream of said downstream extremity, said extension member having a downstream extremity adjacent a downstream end of said outer shroud ring;
a support structure;
means connecting the downstream end of said extension member and the downstream end of said outer shroud ring to said support structure;
a source of cooling air connected to the exterior of said combustion chamber;
a first set of openings provided in said outer chamber wall upstream of said junction to admit a flow of cooling air to the interior of said combustion chamber to form a cooling film at said junction; and
a second set of openings provided in said extension member to provide an air flow path to said vanes through a space defined between the interior surface of said extension member and the exterior surfaces of said outer chamber wall and said outer shroud ring.

2. Gas turbine engine according to claim 1 comprising means connecting the inner shroud ring to the support structure, the inner ring having an upstream extremity axially confronting a downstream extremity of the inner chamber wall, an extension of the duct having an upstream end connected to the inner wall at a further junction upstream of said extremity of the inner wall and a downstream end connected to the support structure at a diameter larger than that of the last mentioned junction.

3. A gas turbine engine according to claim 2, further comprising:

a third set of openings provided in said inner chamber wall upstream of said further junction to admit a flow of air to the interior of said chamber to form a cooling film at said further junction; and a fourth set of openings provided in said duct extension to provide an air flow path to said vanes through a space defined between said duct extension and said inner chamber wall and said inner shroud ring.

4. A gas turbine engine according to claim 1, wherein said second set of openings is located in said extension member adjacent said junction connecting said extension member to said outer chamber wall.

* * * * *